M. E. FRENCH.
MEAT TENDERER.
APPLICATION FILED OCT. 20, 1908.
931,590.
Patented Aug. 17, 1909.
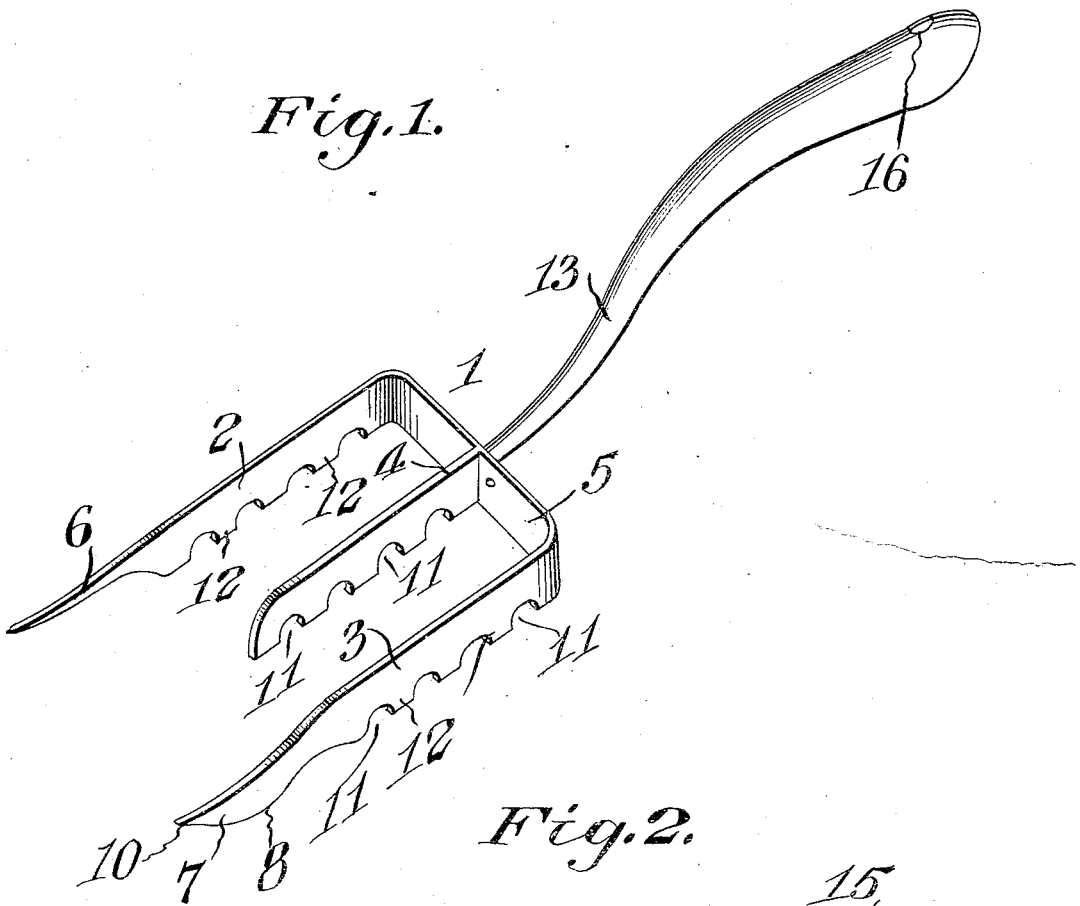
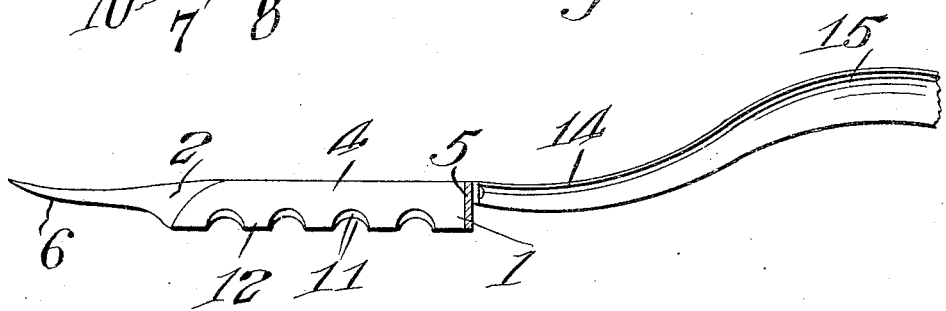
Inventor
Mary E. French
By Victor J. Evans,
Attorney
Witnesses:
Joe. P. Waller,

UNITED STATES PATENT OFFICE.

MARY E. FRENCH, OF CLYDE, OHIO.

MEAT-TENDERER.

No. 931,590.  Specification of Letters Patent.  Patented Aug. 17, 1909.

Application filed October 20, 1908. Serial No. 458,622.

*To all whom it may concern:*

Be it known that I, MARY E. FRENCH, a citizen of the United States, residing at Clyde, in the county of Sandusky and State of Ohio, have invented new and useful Improvements in Meat-Tenderers, of which the following is a specification.

This invention relates to meat tenderers, and has for an object to provide a device of this character which may be constructed in such a manner that it can be conveniently manipulated to effectively cut meat or the like, or in other words partly masticate the same.

A further object of this invention is to provide an article that can be placed upon the market at a relatively low figure and which while effectively serving as a meat tenderer will also be adapted for use as a trimming knife and meat fork.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in both views:—Figure 1 is a perspective view of the meat tenderer. Fig. 2 is a longitudinal section through the same.

Referring now more particularly to the drawing, there is shown a meat tenderer 1 which consists preferably of end blades 2 and 3, and an intermediate blade 4, the latter being somewhat shorter than the blades 2 and 3 as will be clearly seen upon reference to the drawing. The blades 2 and 3 are connected to each other at one end by means of a cross member 5, and as shown, the blade 4 projects from the said member 5 and is formed integral therewith. The blade 2 is provided at its outer end with a prong 6 which extends beyond the outer end of the blade 4. The said prong has its upper edge curved downwardly then upwardly as will be clearly apparent to make the said prongs more effective in the manipulation or handling of meats or the like. The blade 3 at the front end is extended outwardly in a manner similar to the blade 2 and forms a trimming knife 7 having a curved lower edge 8 and a pointed outer end 10.

It will be seen that the pointed end 10 of the trimming knife is such that it may be also used in the manipulation or handling of meats or the like and may assist the prong 6. The said blades are provided with substantially semi-circular series of notches 11 constructed in such manner that they form depending teeth 12 at the lower edge of each blade. A handle 13 is connected to the member 5 and extends outwardly thereof as indicated at 14 and then upwardly as shown at 15, and the said handle is provided adjacent to its outer extremity with a perforation 16 by means of which the article may be supported upon a hook or the like.

It will be seen that an extremely simple and useful article is provided which effectively serves the purpose of a meat tenderer or which may serve other useful functions in a kitchen as is obvious. When the article is in use the handle 13 is grasped and is reciprocated in a vertical plane so that the blades 2, 3 and 4 of the article may be effectively engaged with the meat. The construction of the handle is such that it adds to the blades such weight that the cutting action of the said blades is greatly increased. It will of course be understood that any desired number of intermediate blades may be used, and I do not desire to limit myself to the use of a single one as herein shown and described.

Having thus described the invention what I claim is:—

An article of the class described comprising a blade having a right angularly disposed member at one end, a handle carried by said member disposed directly in line with the blade, and parallel spaced blades carried by the member located at the sides of the first named blade and extended outwardly beyond the end of said blade, one of said last named blades having a pronged outer end, the other of said last named blades having a curved lower edge and a pointed outer end, said blades being provided upon their lower edges with series of notches so that each blade is provided with a plurality of depending teeth.

In testimony whereof I affix my signature in presence of two witnesses.

MARY E. FRENCH.

Witnesses:
 HENRY HOELTZEL,
 HOMER METZGAR.